United States Patent Office 2,799,702
Patented July 16, 1957

2,799,702
SURFACE-ACTIVE AGENTS

Van R. Gaertner, Dayton, Ohio, assignor to Monsanto Chemical Company, St. Louis, Mo., a corporation of Delaware No Drawing. Application December 9, 1954,
Serial No. 474,283

8 Claims. (Cl. 260—513)

The present invention relates to new organic compounds of sulfur having high surface activity in aqueous solution and to the process for preparing said compounds.

According to the invention there is provided a series of new and valuable (alkylmercapto)alkanesulfonic acid compounds possessing especially high wetting-out and lathering properties. The new compounds are easily obtained by the condensation of alkanesultones with alkanethiols in an alkaline medium, the reaction proceeding substantially according to the scheme

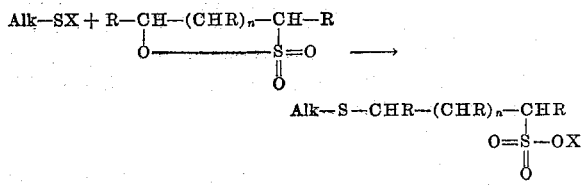

in which Alk denotes an alkyl radical of from 1 to 18 carbon atoms, R is selected from the class consisting of hydrogen and the methyl radical, X is selected from the class consisting of hydrogen, alkali metal, alkaline earth metal and ammonium, and $n$ is an integer of from 1 to 3.

Alkanesultones employed for the production of the present (alkylmercapto)alkanesulfonates are readily available materials which are obtained by a variety of processes. One method employs treatment of an olefinic alcohol such as allyl alcohol with an alkali metal bisulfite such as sodium bisulfite in the presence of air to give a hydroxyalkanesulfonate, e. g., sodium 3-hydroxy-1-propanesulfonate, hydrolysis of the latter to the free sulfonic acid and ring-closure of the latter, e. g., by heating to give the alkanesultone. Another method involves sulfochlorination of an alkyl chloride to give a chloroalkanesulfonyl chloride, hydrolysis of the sulfonyl halide, and ring-closure of the hydrolysis product with hydrogen chloride evolution to give the alkanesultone. Sultones are commonly regarded as ring-closure products of hydroxysulfonic acids and are similar in structure to lactones obtainable by ring closure of hydroxyalkanecarboxylic acids. Hence, a commonly employed system of nomenclature for the alkanesultones recites the hydroxyalkanesulfonic acid from which the alkanesultone is derived. Thus, one sultone which is useful for the present purpose is the sultone of 3-hydroxy-1-propanesulfonic acid

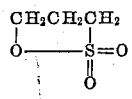

The above sultone is available from allyl alcohol by the above described bisulfite process or from propylchloride by the sulfochlorination process. Sultones which are useful in the present invention for reaction with the alkanethiols to give the (alkylmercapto)alkanesulfonates are, e. g., the sultone of 4-hydroxy-1-butanesulfonic acid, the sultone of 4-hydroxy-2-butanesulfonic acid, the sultone of 3-hydroxy-1-propanesulfonic acid, the sultone of 4-hydroxy-2-methyl-2-butanesulfonic acid, the sultone of 5-hydroxy-2-hexanesulfonic acid, the sultone of 5-hydroxy-1-pentanesulfonic acid, the sultone of 5-hydroxy-2-pentanesulfonic acid, the sultone of 4-hydroxy-2-pentanesulfonic acid, the sultone of 4-hydroxy-2-methyl-2-pentanesulfonic acid, etc.

Alkanethiols which are employed with the sultones to give the present sulfonates are, for example, methanethiol, ethanethiol, propanethiol, tert-butanethiol, isopentanethiol, n-octanethiol, (2-ethylhexane)thiol, n-decanethiol, tert-dodecanethiol, 2-(butyloctane)thiol, n-undecanethiol, n-tetradecanethiol, (7-ethyl-2-methyl)undecanethiol, n-hexadecanethiol, n-heptadecanethiol, n-octadecanethiol, etc.

Sulfonic acid compounds provided by the present invention include: sodium 3-(methylmercapto)-1-propanesulfonate, potassium 4-(isopropylmercapto)-2-butanesulfonate, sodium 3-(n-butylmercapto)-1-propanesulfonate, ammonium 4-(isoamylmercapto)-1-butanesulfonate, sodium 3-(n-heptylmercapto)-1-propanesulfonate, 3-(n-dodecylmercapto)-1-propanesulfonic acid, sodium 3-(n-decylmercapto)-1-propanesulfonate, potassium 4-(n-tetradecylmercapto)-1-butanesulfonate, sodium 4-(octadecylmercapto)-2-butanesulfonate, ammonium 3-(n-dodecylmercapto)-1-propanesulfonate, lithium 4-[(2-butyloctyl)mercapto]-2-methyl-2-pentanesulfonate, sodium 4-(isooctylmercapto)-2-methyl-2-butanesulfonate, barium 5-(n-decylmercapto)-1-pentanesulfonate, etc.

In my copending application, Serial No. 474,282 filed of even date, and now abandoned, there is disclosed the preparation of 2-(alkylmercapto)-1-ethanesulfonates by reaction of an alkanethiol with an isethionic or 2-methylisethionic acid compound. I have found that (alkylmercapto)alkanesulfonates in which the alkane radical is a chain of more than 2 carbon atoms, as in the present instance, are not obtainable by employing instead of isethionic acid a hydroxyalkanesulfonate having more than 2 carbon atoms in the alkane chain. The present process thus provides a means of obtaining valuable surface-active (mercaptoalkyl)alkanesulfonates which are not obtainable by the process of said copending invention.

In preparing the present (alkylmercapto)alkanesulfonates, I may contact the sultone with the alkanethiol in alkaline medium, or I may contact the sultone with a preformed salt of the thiol, e. g., an alkali metal mercaptide. Examples of alkaline materials useful for the present purpose are ammonium hydroxide, the alkali metal or the alkaline earth metal oxides or hydroxides and basic reacting salts thereof such as the sodium, potassium, calcium, barium or lithium oxides, hydroxides, carbonates, bicarbonates, and acetates. The alkali metal alcoholates or phenoxides are convenient basic materials for the present purpose in that their use permits operation in organic solvents or diluents, e. g., ethanol, isopropanol, or phenol, from which the present (alkylmercapto)alkanesulfonates are readily separated. Alkali metal alcoholates or phenoxides which are preferred are: sodium, potassium or lithium methoxides, propoxides, butoxides, or phenoxides.

While condensation of the sultone and the alkanethiol may be effected either in the presence or absence of an inert solvent or diluent, operation is smoother and manipulation of the reactants is facilitated when a solvent or diluent is used. When working with an inorganic alkali, water, or a mixture of water and an inert solvent or diluent is preferably employed. Organic materials which may be used either as diluents with the inorganic alkaline agents or as solvents with the alkali alcoholates or phenoxides are, for example, lower boiling alcohols such as methanol, ethanol, isopropanol, or n-butanol; ethers such as ethyl or isopropyl ether; hydrocarbons such as benzene, toluene or hexane, etc. In some instances it is convenient to prepare the metal alcoholate or phenoxide in situ employing an excess of the hydroxy component as diluent. Thus the initial reaction mixture may consist of the sultone, the alkanethiol, an alkali metal or an alkaline earth metal hydroxide, and an alcohol.

Reaction of the sultone with the thiol takes place readily at ordinary or increased temperatures. The sultone is simply contacted with the thiol in the presence of the alkaline agent and the resulting mixture is allowed to stand until formation of the sulfonate is complete. The alkaline agent is generally mixed with the thiol initially. Because the reaction is generally exothermic, gradual addition is usually advantageous, the rate of the addition being so regulated as to avoid too sudden a rise in temperature; in most instances the reaction is complete by the time all of the reactants have been contacted with each other; however, depending upon the nature of the individual sultone and thiol, it may be expedient to allow the reaction mixture to stand at least until it attains room temperature. With some of the alkanethiols, moderate heating may be desirable. Superatmospheric pressure may or may not be employed. Isolation of the sulfonate is effected by removing any unreacted material, e. g., by distillation, by extracting the sulfonate with water, etc. In most instances, however, when employing substantially equimolar quantities of thiol and sultone, no isolating procedures are required, the crude reaction mixture being applicable for direct use as surfactant.

The present (alkylmercapto)alkanesulfonates are stable, water-soluble, generally white to slightly yellow, friable solids or powdery materials. They are advantageously employed for a variety of industrial and agricultural purposes. They are generally valuable as biological toxicants. Those of the sulfonates which are prepared from alkanethiols of from 8 to 18 carbon atoms and particularly the alkali metal and ammonium salts are surfactants. The very high surface-activity of aqueous solutions of even very small amounts of such sulfonates makes them particularly valuable as wetting-out and lathering agents. Many of the members of this series of compounds possess extremely good foaming properties, especially in hard water.

The present invention is further illustrated, but not limited, by the following examples:

*Example 1*

This example describes the reaction of propane sultone with a tert-dodecanethiol obtained by the reaction of hydrogen sulfide with propylene tetramer or butylene trimer.

An alkaline solution of the thiol was prepared by heating a mixture consisting of 19.3 g. (0.10 mole) of the thiol, 50 ml. of ethanol and 4.0 g. (0.10 mole) of sodium hydroxide. The solution was cooled to 30° C. and there was then added to it dropwise during a period of 15 minutes 12.2 g. of propanesultone, i. e., the sultone of 3-hydroxy-1-propanesulfonic acid. Reaction of the sultone with the thiol was exothermic, the temperature rising rapidly to 55° C.; but it was maintained at about this temperature by the dropwise addition. After all of the sultone had been added, the reaction mixture was cooled to 45° C. at which temperature it began to crystallize. It was then maintained at room temperature for an additional 30 minutes. The resulting thick slurry was diluted with 100 ml. of acetone, stirred, and then filtered. After repeated washing of the precipitate with acetone and drying, there was obtained 28.0 g. of the substantially pure sodium 3 - (tert - dodecylmercapto) - 1-propanesulfonate. Another 2.0 g. of the sulfonate was obtained from the combined liquors upon cooling to about 0° C. by aspiration, filtering off the resulting solid, washing it with acetone and drying. The total quantity of sodium 3-(tert-dodecylmercapto)-1-propanesulfonate thus obtained represented a 75.6% theoretical yield.

Sodium 3 - (tert-octylmercapto)-1-propanesulfonate or sodium 3 - (tert - hexadecylmercapto)propanesulfonate is similarly prepared by using tert-octanethiol or tert-hexadecanethiol instead of tert-dodecanethiol.

*Example 2*

Evaluation of the wetting-out property of the sodium 3-(tert-dodecylmercapto)-1-propanesulfonate of Example 1 was conducted by employing the Draves Test of the American Association of Textile Chemists. The following speed of wetting in seconds was obtained at the indicated percent concentrations.

| Percent concentration: | Speed of wetting |
| --- | --- |
| 0.5 | Instantaneous |
| 0.25 | 1.7 |
| 0.125 | 5.5 |
| 0.0625 | 15.3 |
| 0.031 | 136 |
| 0.015 | +180 |

Evaluation of the foaming properties of the sodium 3-(tert-dodecyl-1-propanesulfonate of Example 1 was conducted by employing the Ross-Miles Lather Test of the American Society for Testing Materials. When tested in water of 50 P. P. M. hardness, the sulfonate gave an initial foaming value of 20.4 cm. and after five minutes this value remained the same. In water of 300 P. P. M., the initial foaming value was 21.5 cm. and after five minutes, this value decreased to 20.6 cm.

What I claim is:

1. An alkali metal 3-(alkylmercapto)-1-propanesulfonate having from 8 to 18 carbon atoms in the alkyl radical.
2. Sodium 3 - (tert - dodecylmercapto) - 1-propanesulfonate.
3. Sodium 3 - (tert-octylmercapto)-1-propanesulfonate.
4. Sodium 3 - (tert-hexadecylmercapto)-1-propanesulfonate.
5. The method which comprises contacting, in the presence of a basic alkali metal compound, an alkanethiol of from 8 to 18 carbon atoms with the sultone of 3-hydroxy-1-propanesulfonic acid and recovering from the resulting reaction product a 3-(alkylmercapto)-1-propanesulfonate having from 8 to 18 carbon atoms in the alkyl radical.
6. The method which comprises contacting tert-dodecanethiol with the sultone of 3-hydroxy-1-propanesulfonic acid in the presence of sodium hydroxide and recovering sodium 3-(tert-dodecylmercapto)-1-propanesulfonate from the resulting reaction product.
7. The method which comprises contacting tert-octanethiol with the sultone of 3-hydroxy-1-propanesulfonic acid in the presence of sodium hydroxide and recovering sodium 3-(tert-octylmercapto)-1-propanesulfonate from the resulting reaction product.
8. The method which comprises contacting tert-hexadecanethiol with the sultone of 3-hydroxy-1-propanesulfonic acid in the presence of sodium hydroxide and recovering sodium 3-(tert-hexadecylmercapto)-1-propanesulfonate from the resulting reaction product.

References Cited in the file of this patent

UNITED STATES PATENTS

| 2,480,859 | Hollander | Sept. 6, 1949 |

FOREIGN PATENTS

| 463,544 | Great Britain | Mar. 30, 1937 |
| 743,570 | Germany | Apr. 22, 1954 |

OTHER REFERENCES

Helberger et al.: 44 C. A. col. 1892 (1950).